Patented June 23, 1953

2,643,237

UNITED STATES PATENT OFFICE 2,643,237

IMIDES AS STABILIZERS FOR POLYSULFONE RESINS

John F. Howe and John E. Wicklatz, Bartlesville, Okla., assignors to Phillips Petroleum Company, a corporation of Delaware No Drawing. Application August 13, 1951, Serial No. 241,688

30 Claims. (Cl. 260—29.6)

This invention relates to new heteropolymeric resin compositions and their preparation. In one aspect this invention relates to a method for producing thermally stable olefin-sulfur dioxide resins. In another aspect this invention relates to incorporating imides in an olefin-sulfur dioxide resin. In still another aspect this invention relates to a polysulfone resin which is resistant to thermal decomposition.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as additives for the olefin-sulfur dioxide resins. These additives include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence.

We have discovered that olefin-sulfur dioxide resins can be rendered resistant to thermal decomposition when an imide is incorporated therein as a stabilizing agent. When added to an olefin-sulfur dioxide resin according to the method of our invention imides impart excellent thermal stability to said resins.

According to this invention there is provided a process for the production of a thermally stable olefin-sulfur dioxide resin which comprises the step of adding an imide to said resin prior to the molding step.

Imides which can be employed in the practice of the present invention include compounds of the formula

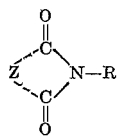

wherein Z can be an aliphatic group containing not more than 18 carbon atoms or an aryl group attached in ortho configuration, and R can be hydrogen or an aliphatic or substituted aliphatic group containing not more than 10 carbon atoms, or an aryl group. Typical compounds applicable to the present invention include succinimide, phthalimide, N-phenylphthalimide, beta-bromoethylphthalimide and the like.

In order to effect the desired degree of stabilization from 0.2 to 10, preferably 0.5 to 5 weight per cent based on the weight of the resin of imide is incorporated in the molding composition employed, although amounts outside these ranges will, to the extent added, yield the results of the invention.

The compounds of the present invention may be incorporated in olefin-sulfur dioxide resins in a number of ways, the important factor being that the imide be thoroughly and intimately mixed with the resin. Thus, for example, the stabilization agent may be added to an aqueous dispersion of the resin in which the latter was prepared and both the resin and stabilizer precipitated therefrom simultaneously. An aqueous dispersion of the stabilization agent may also be added to a neutral latex. The stabilizer may be dissolved in methanol, or other suitable solvent and thoroughly admixed with a dry, powdered resin and the solvent subsequently removed by evaporation or other suitable means. The compounds of the present invention are applicable for the stabiliaztion of olefin-sulfur dioxide resins produced by any method such as polymerization in excess sulfur dioxide or acetone or other suitable solvent. When operating with latices, it has usually been preferred to employ resins produced by emulsion polymerization methods, more particularly resins produced by the method disclosed in copending application Serial Number 8,755, filed February 16, 1948, by Willie W. Crouch and Ernest W. Cotten.

Organic compounds which enter into the formation of heteropolymeric resins as described herein include mono-olefins, cyclo-olefins, and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, acrylonitrile, etc. The process comprises reacting the unsaturated compound and sulfur dioxide in aqueous emulsion in the presence of suitable catalysts and emulsifying agents and also bulk polymerization in a homogeneous system comprising olefin, sulfur dioxide and catalyst.

PREPARATION OF 1-BUTENE-SULFUR DIOXIDE RESIN

An olefin-sulfur dioxide resin was prepared using the following emulsion recipe in a stainless steel autoclave.

| | Parts by weight |
|---|---|
| Commercial 1-butene [1] | 57.7 |
| Sulfur dioxide | 88.3 |
| Water | 180 |
| Ammonium nitrate | 0.5 |
| Maprofix MM [2] | 0.6 |

[1] The commercial 1-butene had the following composition:
[2] Sodium laurylsulfate dispersing agent commercially available in the form of a paste containing about 60 per cent solids.

| | Mol per cent |
|---|---|
| 1-butene | 63.2 |
| 2-butene-cis | 1.0 |
| 2-butene-trans | 12.5 |
| n-Butane | 13.4 |
| Isobutane | 4.6 |
| $C_3$ | 1.0 |
| Isobutylene | 3.6 |
| Butadiene | 0.7 |

The polymerization was conducted for a period of seven hours at a temperature of 100° F. A conversion of 95 per cent was reached.

At the end of the reaction period, the reactor was opened and excess sulfur dioxide vented therefrom. The latex was coagulated with methanol; the resin was then removed by filtration and dried in air at 130° to 150° F. for 16 hours.

Example I

A series of runs was made wherein solutions of imides in methanol were added to dry butene-sulfur dioxide resins obtained from a latex prepared according to the procedure described herein. After thoroughly commingling the resin stabilizer solution, the solvent was removed by evaporation. Resins so treated were tested for thermal stability in the following manner.

Two or three grams of treated resin were placed in a suitable test tube which was then partially immersed in a constant temperature bath held at 325±2° F. for varying periods. Per cent loss in weight of the resin was determined at the end of said selected heating periods. The per cent loss in weight provides a measure of the thermal decomposition which took place. Untreated controls were run simultaneously. Results of the tests were recorded in the following table:

| | Percent loss in Weight at End of $x$ Hours' Heating Time | | |
|---|---|---|---|
| | 0.5 | 1 | 3 |
| Sample I: | | | |
| Control | 8.1 | 10.8 | 16.6 |
| 2% beta-bromoethylphthalimide [1] | 3.8 | 5.8 | 9.9 |
| Sample II: | | | |
| Control | 6.0 | 9.2 | 16.8 |
| 2% N-phenylphthalimide [1] | 5.9 | 7.9 | 11.9 |

[1] Weight percent based on weight of dry resin.

Example II

A run was made wherein an aqueous solution of succinimide was added to a sample of a coagulated, washed, and filtered resin,* that is, to a wet resin filter cake. After thoroughly commingling the resin and stabilizer solution, water was removed by evaporation. The resin so prepared was tested for thermal stability as per Example

*Butene-sulfur dioxide resin as herein described.

I. Results of tests are recorded in the following table:

| | Percent Loss in weight at End of $x$ Hours' Heating Time | | |
|---|---|---|---|
| | 0.5 | 1 | 3 |
| Control | 8.1 | 10.8 | 16.6 |
| 2% succinimide [1] | 5.7 | 7.9 | 12.0 |

[1] Weight percent based on weight of dry resin.

Example III

A cyclohexene-sulfur dioxide resin was prepared according to the following recipe:

| Materials | Parts by Weight |
|---|---|
| Cyclohexene | 50.8 |
| Sulfur dioxide | 78.2 |
| Water | 180 |
| Maprofix MM [1] | 1.0 |
| Ammonium nitrate | 0.50 |

[1] Sodium laurylsulfate dispersing agent available in the form of a paste containing about 60 percent solids.

The reaction was carried out at 10° C. for a period of 6 hours. The conversion was 88.7 per cent.

The resin was prepared from the latex and dried according to the conventional procedure. (Latex coagulated with methanol.) Results of thermal stability tests using succinimide and N-phenylphthalimide are recorded in the following table:

| Temperature 325±2° F. | Percent Loss in Weight at End of $x$ Hours' Heating Time | | |
|---|---|---|---|
| | 0.5 | 1 | 3 |
| Control | 3.8 | 6.3 | 15.3 |
| 2 weight percent succinimide [1] (based on dry resin) | 3.1 | 5.6 | 11.6 |
| 2 weight percent N-phenylphthalimide [2] (based on dry resin) | 3.4 | 6.5 | 14.9 |

[1] Dissolved in water and solution added to stirred latex. Latex coagulated; resin washed, and dried.
[2] Ground to fine powder and added to stirred latex. Latex coagulated; resin washed, and dried.

The results of tests, as indicated by the examples set out herein, demonstrate that the imides of this invention render polysulfone resins resistant to thermal decomposition.

Although the compounds hereinbefore mentioned are those preferred in the practice of this invention other compounds which can be used include 2-decyl adipimide, 2-hexyl succinimide, and beta-bromoctyl phthalimide.

Reasonable variation and modification are possible within the scope of the disclosure of the invention the essence of which is that the addition of an imide to an olefin-sulfur dioxide resin results in the production of a thermally stable resin and that such a resin has been produced.

We claim:

1. In a method for the preparation of a heteropolymeric resin, formed by the interaction of sulfur dioxide and an unsaturated organic compound, wherein the unsaturation is a double bond between adjacent carbon atoms and which will polymerize with sulfur dioxide to form a resin the improvement which comprises incorporating an imide into said heteropolymeric resin.

2. In a method for the preparation of a heteropolymeric resin, formed by the interaction of an unsaturated organic material, wherein the unsaturation is a double bond between adjacent carbon atoms and which will polymerize with sulfur dioxide to form said resin, and sulfur dioxide, the improvement which comprises incorporating into said heteropolymeric resin an imide characterized by the formula

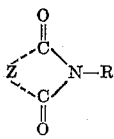

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group.

3. A method for the preparation of a heteropolymeric resin which comprises preparing an aqueous emulsion of an unsaturated organic compound, wherein the unsaturation is a double bond between adjacent carbon atoms and which will polymerize with sulfur dioxide to form said resin and sulfur dioxide in a molecular excess over said unsaturated organic compound, effecting interaction of said unsaturated organic compound with said sulfur dioxide to form a latex, intimately admixing with said latex an imide characterized by the formula

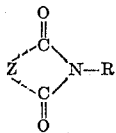

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group, and recovering from the resulting latex admixture a resin having improved resistance to thermal decomposition as a product of the process.

4. The method of claim 2 wherein said unsaturated organic material is selected from the group consisting of an open chain mono-olefin and a mono-cyclic mono-olefin.

5. The method of claim 3 wherein said unsaturated organic compound is selected from the group consisting of an open chain mono-olefin and a mono-cyclic mono-olefin.

6. A method for the preparation of an olefin-sulfur dioxide resin, comprising emulsifying a liquid olefinic organic material in aqueous emulsion and in the presence of sulfur dioxide in a molecular excess of said olefinic organic compound, effecting interaction of said olefinic organic compound with sulfur dioxide to form a latex, introducing into intimate admixture with said latex an imide characterized by the formula

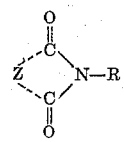

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group and recovering from the resulting latex admixture a resin having improved resistance to thermal decomposition as a product of the process.

7. A composition of matter comprising a heteropolymer of an unsaturated organic material, wherein the unsaturation is a double bond between adjacent carbon atoms and which will polymerize with sulfur dioxide to form said heteropolymer and sulfur dioxide, and an imide.

8. The method of claim 6 wherein said olefinic organic material is selected from the group consisting of an open chain mono-olefin and a mono-cyclic mono-olefin.

9. In a method for the preparation of an olefin-sulfur dioxide resin, the improvement which comprises incorporating into said olefin-sulfur dioxide resin an imide characterized by the formula

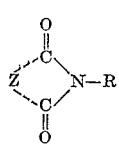

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group.

10. A composition of matter comprising a heteropolymer of an unsaturated organic material, wherein the unsaturation is a double bond between adjacent carbon atoms and which will polymerize to form said heteropolymer and sulfur dioxide, and an imide characterized by the formula

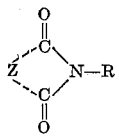

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group.

11. The composition of claim 10 wherein the unsaturated organic material is selected from the group consisting of an open chain mono-olefin and a mono-cyclic mono-olefin.

12. A latex comprising an aqueous emulsion of a resin formed from sulfur dioxide and an unsaturated organic compound wherein the unsaturation is a double bond between adjacent carbon atoms and which will polymerize with sulfur dioxide to form said resin, and an imide.

13. A latex comprising an aqueous emulsion of a resin formed from sulfur dioxide and an unsaturated organic compound wherein the unsaturation is a double bond between adjacent carbon atoms and which will polymerize with sulfur dioxide to form said resin, and an imide characterized by the formula

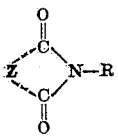

wherein Z is a radical selected from the group consisting of an aliphatic group containing not more than 18 carbon atoms, and an aryl group attached in ortho configuration; and R is a radical selected from the group consisting of hydrogen, an aliphatic group containing not more than 10 carbon atoms, a substituted aliphatic group containing not more than 10 carbon atoms and an aryl group.

14. The method of claim 1 wherein the imide is succinimide.

15. The method of claim 1 wherein the imide is phthalimide.

16. The method of claim 1 wherein the imide is N-phenylphthalimide.

17. The method of claim 1 wherein the imide is β-bromoethylphthalimide.

18. The composition of claim 7 wherein the imide is succinimide.

19. The composition of claim 7 wherein the imide is N-phenylphthalimide.

20. The composition of claim 7 wherein the imide is β-bromoethylphthalimide.

21. The composition of claim 12 wherein the imide is succinimide.

22. The composition of claim 12 wherein the imide is phthalimide.

23. The composition of claim 12 wherein the imide is N-phenylphthalimide.

24. The composition of claim 12 wherein the imide is β-bromoethylphthalimide.

25. The method of claim 2 wherein the unsaturated organic material is 1-butene.

26. The method of claim 2 wherein the unsaturated organic material is cyclohexene.

27. The composition of claim 7 wherein the unsaturated organic material is 1-butene.

28. The composition of claim 7 wherein the unsaturated organic material is cyclohexene.

29. The composition of claim 12 wherein the unsaturated compound is 1-butene.

30. The composition of claim 12 wherein the unsaturated compound is cyclohexene.

JOHN F. HOWE.
JOHN E. WICKLATZ.

No references cited.